April 6, 1948. J. K. WOOD 2,439,067
SUPPORT DEVICE
Filed March 27, 1943 3 Sheets-Sheet 1
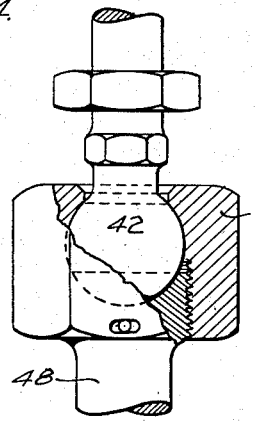
Fig. 4.
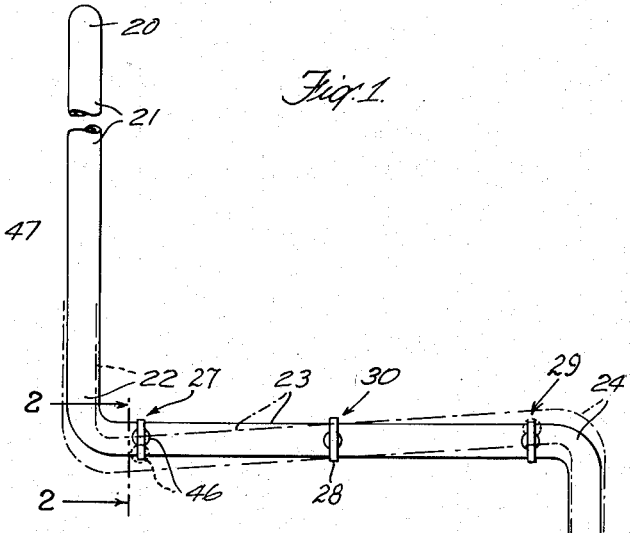
Fig. 1.
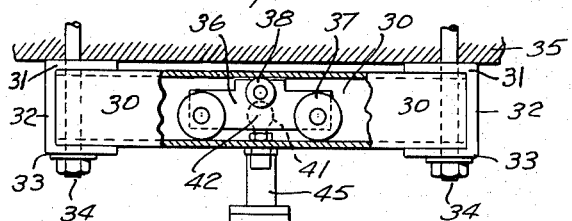
Fig. 2.
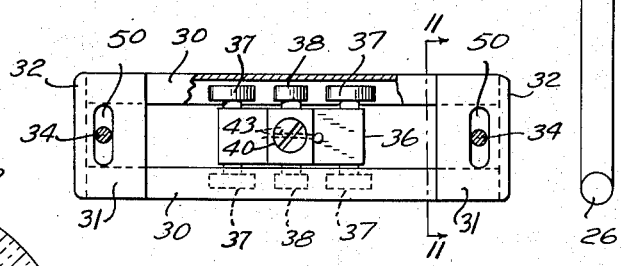
Fig. 3.
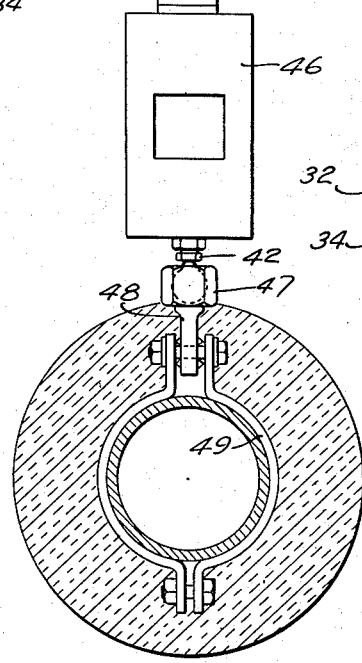
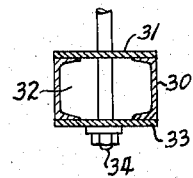
Fig. 11.
INVENTOR
JOSEPH KAYE WOOD.
BY
Blair, Curtis + Hayward
ATTORNEYS

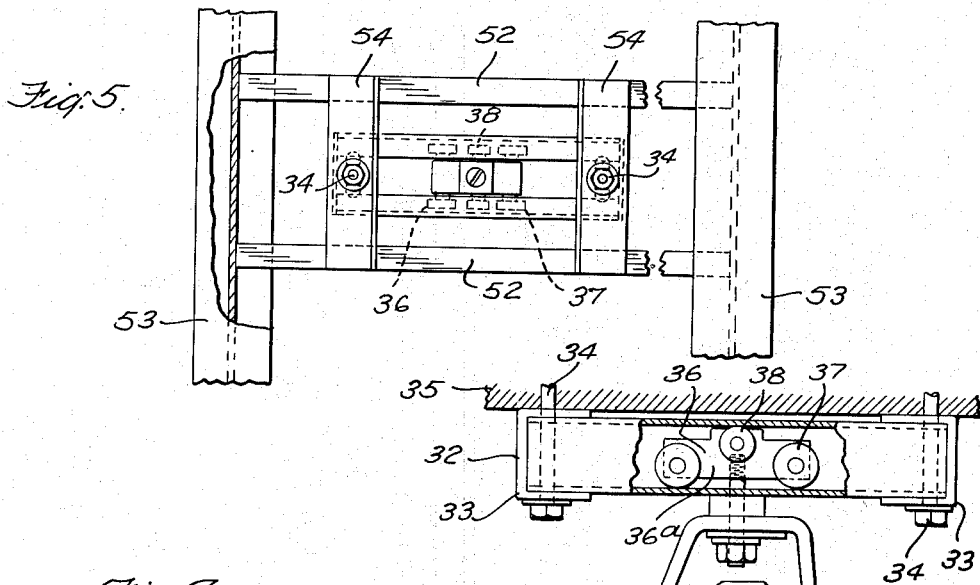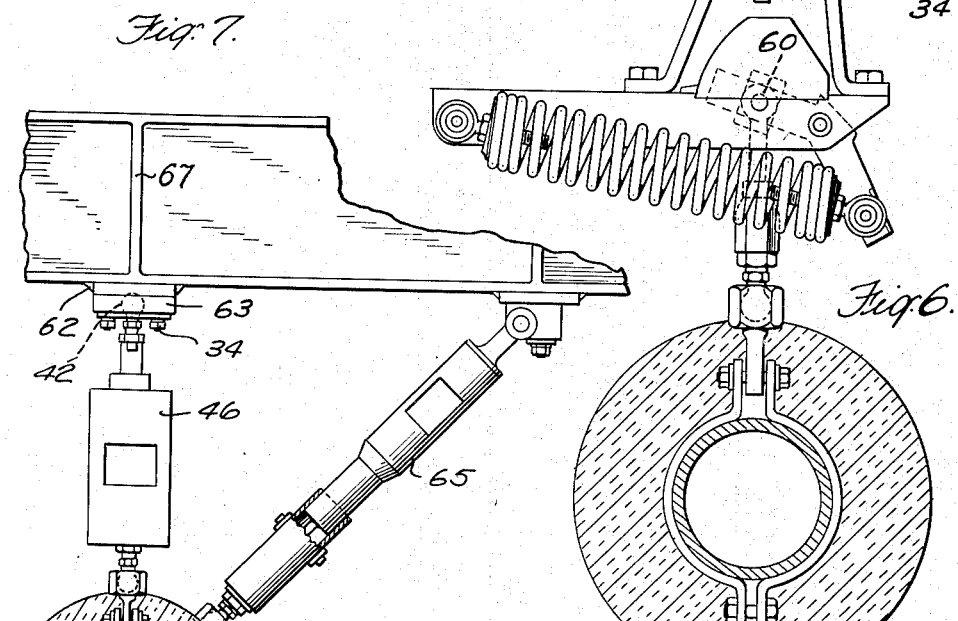

April 6, 1948.　　　J. K. WOOD　　　2,439,067
SUPPORT DEVICE
Filed March 27, 1943　　　3 Sheets-Sheet 3

INVENTOR
JOSEPH KAYE WOOD.
BY
Blair, Curtis & Hayward
ATTORNEYS

Patented Apr. 6, 1948

2,439,067

UNITED STATES PATENT OFFICE 2,439,067

SUPPORT DEVICE

Joseph Kaye Wood, New York, N. Y., assignor to General Spring Corporation, New York, N. Y., a corporation of New York Application March 27, 1943, Serial No. 480,746

11 Claims. (Cl. 248—54)

This invention relates to piping systems and more particularly to devices for supporting piping systems against vibration and shock while at the same time permitting automatic adjustment of the position of the pipe to accommodate thermal expansion or other normal and necessary relative movement between the piping and its support.

Prior to the present invention it has become customary in the best engineering practice to provide supports for piping systems which are capable of yielding resiliently so as to accommodate whatever relative movement may occur normally and necessarily between piping and its support and thus help to avoid imposing excessive strains upon the piping system itself. In my prior Patents No. 2,145,704, dated January 31, 1939, and No. 2,256,784, dated September 23, 1941, among others, I have described and claimed devices which are particularly suitable for this purpose. These devices of my prior patents have gone into wide commercial use and have been universally accepted as the best practice for stationary power plant engineering. On marine piping systems, however, and other piping systems subjected to severe vibration or "whip" or other alternating inertial forces and shock of various types, the devices as described in my prior patents have left certain problems and difficulties unsolved; and in piping systems having long lines connected at an angle or by a transverse leg, special problems of suspension arise which have not heretofore been altogether solved.

In my copending applications Serial Nos. 399,068, now Patent No. 2,325,725, 433,883, and 467,034, I have described various devices designed to improve the suspension of piping systems in marine vessels and locations subject to vibration, earthquake, bombing or other alternating inertial stresses.

It is an object of my present invention to provide an improved connection and mounting for such devices, particularly when used in locations subject to alternating inertial forces. Another object of my invention is to eliminate pounding in piping supports. Another object of the invention is to provide for a more perfect self-adjustment of piping supports. Another object of the invention is to provide for a more perfect vertical and lateral adjustment of a piping support to fit the proper positioning of the piping system. Other objects and advantages of my invention will be apparent to those skilled in the art from the accompanying drawings and the following description.

In the drawings and in the following description I have set forth and described a preferred embodiment of my invention and various modifications thereof. These are not intended to be exhaustive nor limiting of my invention; on the contrary, they are selected and described with a view to explaining the principles of my invention and the manner of their application in practical use, and of instructing others skilled in the art so that they may be enabled to apply these principles and to utilize the invention in numerous embodiments with numerous modifications each as may be best adapted to conditions of a particular use.

In the accompanying drawing,

Figure 1 is a diagrammatic plan view of a piping system showing portions thereof connected at an angle to one another, showing in broken lines the effect of thermal expansion or of a possible wrenching of the frame of the structure upon which the piping system is mounted;

Figure 2 is a view in greater detail of a support device embodying my invention taken, for example, at the location indicated by line 2—2 on Figure 1;

Figure 3 is a top plan view partly in section of the track and truck structure shown at the top of Figure 2;

Figure 4 is a detail view on an enlarged scale and partly in section of the lower ball and socket connection shown in Figure 2;

Figure 5 is a top plan view of an alternative mounting structure for the track and truck assembly;

Figure 6 is similar to Figure 2 but showing a different type of resilient counterbalancing device;

Figure 7 is similar to Figure 2 but showing a different mounting device instead of the track and truck structure and also showing an angular support device embodying my invention in addition to the vertical support device.

Figure 11 is a view in vertical section taken on line 11—11 of Figure 3.

Figure 8:
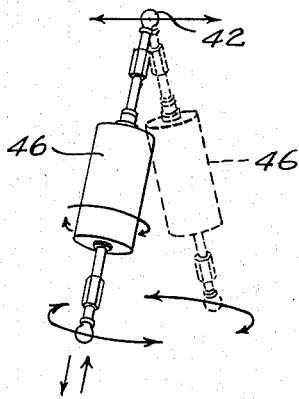
Figure 8 is a diagrammatic view indicating the various movements available in my device.

Referring first to Figure 1, there is shown in diagrammatic plan view a horizontal portion of piping system extending on three connected legs, each at an angle to the others. A vertical riser connects with the pipe at 20, and from this connection or elbow the pipe extends horizontally along one leg 21 shown broken away. At 22 the pipe bends and follows a different direction along the second leg 23, and at 24 the pipe bends again to follow in this case a direction parallel to the leg 21 throughout the legs 25. At 26 the pipe is shown turning upward into a second vertical leg.

This entire length of piping may be supported at suitable intervals along its length by devices embodying my invention. For purposes of illustration, I have shown three such devices mounted along the leg 23; and, in broken lines, I have illustrated how expansion of the legs 21 and 25 will cause relative twisting of the connecting leg 23, while expansion of the leg 23 itself will cause increase in its length which, depending upon the relative length of the various legs, may merely compensate for the twisting movement so that the connectors 27 and 29 may move in paths parallel to the legs 21 and 25, or may actually cause these devices 27 and 29 to move outward along the axis of the pipe.

Whatever may be the actual movement of the portion of the pipe to which these supporting devices are attached, it is important that the supporting device itself should adjust readily so as to hold a vertical position above the natural position of that point on the pipe. This is accomplished, according to my present invention, by mounting, above the pipe and along a line vertically above that on which the point of attachment on the pipe of each of the hangers 27, 28 and 29 moves throughout its normal range of positions, a track member consisting of parallel channel bars or rails 30 connected at their ends by cross members 31, 32, 33 bolted as shown at 34 or otherwise attached to a suitable beam, deck or gallery, or other supporting structure 35.

The channel rails 30 are mounted with their channels facing one another and between them, rolling on the inner faces of the channel flanges, is a truck member 36 having wheels 37 and 38 rotatably mounted on opposite sides thereof and positioned to roll with some pressure on the lower and upper flanges of the channel rails respectively. These flanges of the channel rails are ground to substantially accurate and straight surfaces and likewise the wheels are ground to substantially accurate circular surfaces so that the truck may roll on the rails and adjust itself readily to any position of the piping without catching at any point and holding back from a satisfactory readjustment.

The frame of the truck 36 may be made of a solid piece of steel provided with a relatively large opening 40 from its upper side, a smaller and flared opening 41 at its under side, and between these a spherical annular surface adapted to provide a socket for the ball and socket joint. On this surface rests the male or ball member 42, and over this a plug 43 is screwed into the opening 40 until its spherically recessed under-surface snugly fits against the upper spherical surface of the ball 42. Plug 43 is then locked in this position and the threaded member of the male or ball member 42 is screwed into the piston shaft 45 of a spring dashpot device 46 adapted to accommodate slow thermal movements but to resist rapid inertial movement. This dashpot device may be constructed substantially as shown and described in my copending application Serial No. 467,034, now Patent No. 2,335,834, or other suitable resiliently expansible and contractable member may be used in its stead.

At the bottom of this spring dashpot device, a second ball and socket joint is provided and shown in greater detail in Figure 4. Here again a male or ball member 42 is provided threaded into the bottom of the expansible member 46, and this is received on the annular spherical surface or socket of a nut 47, which in turn is threaded onto the connecting shaft 48, the upper surface of which is provided with a spherical socket adapted to fit the male or ball member 42. The lower surface of the shaft 48 is adapted to engage a pipe clamp 49, as shown and embodied in my co-pending application Serial No. 480,747, filed herewith, which may be connected or secured to the pipe in any other desired manner.

The device as just described, is mounted above the piping at a point, such as those shown at 27 and 29 in Figure 1, wherein the piping is subjected to substantial lateral movement; and it is carefully adjusted so as to bring the rails 30 parallel to and directly above and close to the path followed by the point of attachment (e. g., of the shaft 48) of the supporting device.

In order that this parallelism may be adjusted with substantial accuracy, the end plates 31 are made with elliptical holes 50 whereby, after the rails have been bolted in place but before the bolts 34 have been tightened, final minute adjustment can be made.

It is also an advantage of the device just described that accurate vertical adjustment may also be made. To this end one or both of the male members 42 is provided with a threaded shank which threads into the end of the expansible supporting member 46; and, because of the use of a rotatable universal joint connection, it is possible to thread this shank to a greater or less extent into the end of the expansible member, whereby to adjust with exactness to the required length for supporting the pipe at the desired position, and to bring the expansible member 46 into its proper range of operation with respect to the range of movement of the piping.

With the device thus connected and adjusted, the lateral movement of the points 27 and 29 on the pipe will be transmitted through the supporting connection to the truck 36, which will thereby be rolled along the rail 30 so as to keep the supporting device always essentially vertical.

In Figure 2 I have shown the track unit bolted directly to a beam or deck or other supporting structure, but in many cases it may be found that there is no convenient supporting structure immediately above the desired point of support. In such cases I have found it desirable to arrange a bridge structure such as that shown in Figure 5, wherein parallel beams 52 are welded or otherwise secured at their ends to girders 53. These are shown positioned at right angles but they may be positioned at any suitable angle required to bring the rails 30 over the point of support and in parallelism with its line of normal movement. Between the beams 52 are cross members, e. g., of angle iron, 54 spaced so as to provide the necessary support for the end of the track unit, and into these, as shown, the bolts 34 are mounted.

In Figure 6 I have shown a similar arrangement to that shown in Figure 2, excepting that in this case a constant support hanger of the type described and claimed in my prior Patents Nos. 2,145,704 and 2,256,784 is used instead of the dashpot device of my co-pending application Serial No. 467,034. In this case also I have provided for the universal angular movement at the pivot 60 on the crank arm of the constant tension hanger device, and it is therefore unnecessary to use a ball and socket joint at the truck 36a. Instead the hanger is directly bolted to the truck. This may be either a rigid connection or a thrust bearing permitting a rotational movement of the hanger in the truck.

Figure 9:
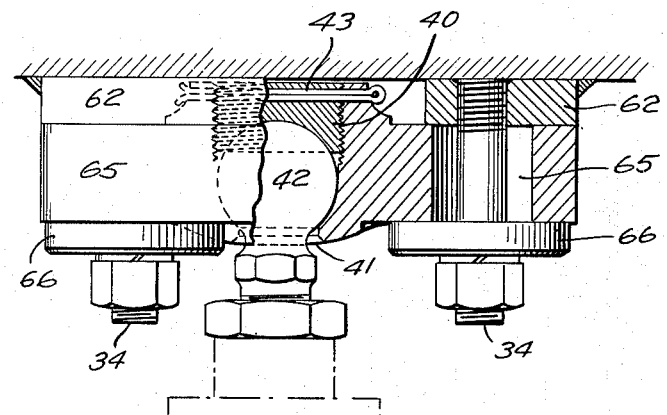
Figure 9 is a view partly in elevation, partly in section, on an enlarged scale showing the modified device for attaching the ball and socket joint to the supporting structure.
Figure 10:
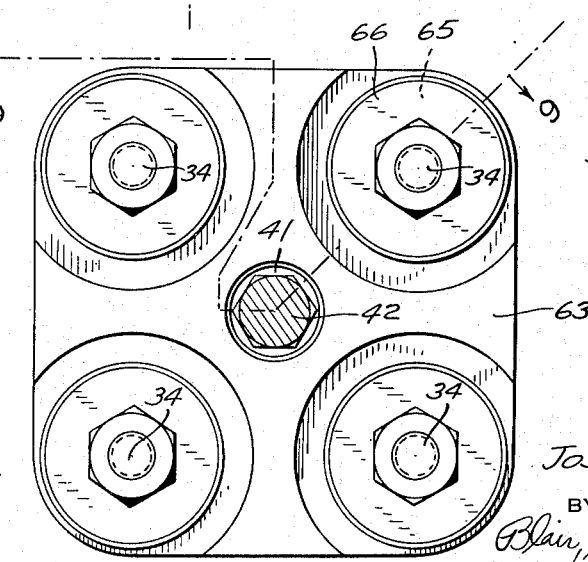
Figure 10 is a bottom plan view of the device shown in Figure 9.

At point 28, or at points along the legs 21 and 25 where there is substantially no lateral movement of piping, the truck and track portions of the hanger are unnecessary, and in such cases I may use connections such, for example, as that shown in Figures 7, 8 and 9. In this case an anchor plate 62 is welded to the supporting structure, such as beam, deck, gallery, etc., and onto this is then bolted a female or socket member 63, one form of which is best shown in Figure 9. As there shown, a spherically recessed plug 43 is screwed into a central opening 40 in the socket member 63, and onto the male or ball member 42, which is received in this opening, carried on the spherical annular surface and extends through the lower flared opening 41 in exactly the same manner as already described in connection with Figure 2. At the four corners of the socket plate 63 are over-size holes 65 covered by the washers 66, and through the holes and washers extend supporting bolts 34. By reason of the over-size, exact lateral adjustment can be secured, as described for example in connection with Figure 2, so that the entire supporting device is kept in vertical alignment above the point of support on the piping.

The ability of the universal joint connection to permit rotational movement is of particular importance at a point of support such as that indicated at 28 wherein the thermal expansion or movements due to wrenching of the main supporting frame causes rocking or twisting of the piping about the axis of the supporting device. By relieving the supporting device from stresses due to this twisting, it reacts more freely to the normal vertical movement and thereby relieves the piping of strains which would otherwise be imposed.

In Figure 8, I have represented diagrammatically these various movements by appropriate arrows and alternative positions shown in broken lines. Thus the upper pivot may move horizontally in either direction; the whole device may swing or turn universally about the pivot, and the lower pivot may move up and down as well as accommodate changing angular relations and rotation relative to the pipe.

In Figure 7, I have shown in addition to the yieldable suspension device 46 a lateral support or sway brace device 65. This may be, for example, of the type and construction shown and described in my prior copending application, Serial No. 433,883, filed March 9, 1942, now Patent No. 2,335,833. The use of such a device is particularly important in marine piping and other piping systems subjected to lateral inertial forces and especially where the free lateral swinging and/or lateral travel are provided as by the ball and socket connections 42 and truck support 36 as shown in the accompanying drawing.

In Figure 7, I have also shown a transverse web 67 welded between the flanges of the supporting beam to give it greater stiffness to meet the forces imposed by the weight of the pipe line.

As many possible embodiments may be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. In a piping system having lengths of connected piping extending along different horizontal directions, whereby longitudinal thermal expansion of one of said lengths causes lateral movement of an adjacent portion of a connected length extending in a different direction, the combination therewith of a pair of spaced channel members substantially rigidly positioned edgewise and facing one another and parallel to a vertical plane approximating the path of free thermal movement of a point on said laterally moving piping, a truck movably mounted in said channels having rollers adapted to roll on each of the flanges respectively of said channels, the floors of said channels sloping outwardly toward said vertical plane, whereby said truck tends to hold a central position, a spring hanger carried by said truck, a ball and socket connection between said truck and said hanger, and a ball and socket connection between said spring hanger and said pipe.

2. In a piping system having lengths of connected piping extending along different horizontal directions, whereby longitudinal expansion of one of said lengths causes lateral movement of an adjacent portion of a connected length extending in a different direction, the combination therewith of a pair of spaced tracks, substantially rigidly positioned along a horizontal axis lying in a vertical plane approximating the path followed by a point on said laterally moving piping when freely expanding and contracting, a truck movably mounted on said tracks and having a frame and rollers mounted on said frame so as to roll on said tracks, a suspension member connected between said piping and the truck, and articulated connections between the pipe and said suspension member and between the frame of said truck and said suspension member, respectively.

3. In a piping system having lengths of connected piping extending along different horizontal directions, whereby longitudinal thermal expansion of one of said lengths causes lateral movement of an adjacent portion of a connected length extending in a different direction, the combination therewith of a pair of spaced channel members substantially rigidly positioned edgewise and facing one another and parallel to a vertical plane approximating the path of free thermal movement of a point on said laterally moving piping, a truck movably mounted in said channels having rollers adapted to roll on each of the lower flanges respectively of said channels, and other rollers adapted to roll on the upper flanges, the floors of said channels sloping outwardly toward said vertical plane, whereby said truck tends to hold a central position, said truck having a spherical recess therein with a central opening in its bottom and a threaded opening extending thereabove of radius at least as great as the radius of curvature of said spherical recess, a plug threaded into said opening having a complementary spherically concave end and a suspension member having a ball fitted between said plug and said recess and a neck extending through said opening.

4. A support device for piping systems which comprises a pair of uniformly spaced, mutually facing, channel bars having the inner faces of their flanges accurately horizontal longitudinally, but transversely sloping outwardly toward the edges of the flanges, frames holding said channels in parallel spaced relation, a truck between said channels which comprises a supporting block, wheels on opposite sides of said block each extending into one channel and adapted to roll on one of its flanges, and means on said block for swingably connecting a supported member thereto.

5. A support device for piping systems which comprises a pair of uniformly spaced, mutually facing, channel bars having the inner faces of their flanges accurately horizontal longitudinally, but transversely sloping outwardly toward the edges of the flanges, frames holding said channels in parallel spaced relation, a truck between said channels which comprises a supporting block, wheels on opposite sides of said block each extending into one channel and adapted to roll on one of its flanges, an upwardly facing spherical recess centrally positioned on said truck and having an opening through its bottom, and a male member having a complementary spherical surface, a load-carrying neck portion extending through said bottom opening, a spring hanger connected to said neck portion of the type having a plunger, a chamber in which the plunger operates and a spring engaged between the plunger and its chamber so as to be stressed by relative movement therebetween, and a ball and socket connection at the opposite end of said hanger adapted to connect the hanger to the piping with universal movement therebetween.

6. A support device for piping systems which comprises a pair of uniformly spaced mutually facing channel bars having the inner faces of their flanges accurately horizontal longitudinally, but transversely sloping outwardly toward the edges of the flanges, frames holding said channels in parallel spaced relation, a truck between said channels which comprises a supporting block, wheels on opposite sides of said block each extending into one of said channels and adapted to roll on the lower of said flanges and spaced from the upper flanges, additional wheels on opposite sides of said truck adapted to roll on the upper of said flanges and spaced from the lower, said block having a hole therethrough which is wider at its upper end, narrower and flaring at its lower end and provided with a spherical annular socket between said wider and narrower portions, a male supporting member having a narrow neck passing through said narrower opening with substantial clearance to permit swinging thereof, and a ball head fitted to said spherical socket, whereby to afford support while permitting universal movement, and a thrust plug secured in the larger opening having its under surface spherically recessed and fitted to said ball head of the supporting member, a yieldable member connected to said male supporting member and comprising a dashpot, spring means connected between relatively movable members of the dashpot for counterbalancing the load, and a second ball and socket universal joint connecting said yieldable member to the piping.

7. A support device for piping systems which comprises a ball and socket connection secured to a fixed member against vertical movement with respect thereto but adapted to permit universal angular and rotary movement relative thereto, a yieldable spring support device for the piping adapted to accommodate vertical thermal movements of the piping but to withstand inertial movements thereof, a second ball and socket member securing said piping to said yieldable spring support device without play but for universal angular and rotary movements.

8. A support device for piping systems which comprises a ball and socket secured to a fixed member against vertical movement with respect thereto, a second ball and socket connection secured to the piping below said first-named connection, each of said ball and socket connections being adapted for universal angular and rotary movements by movement of the ball in the socket but said balls each being substantially fitted in its socket whereby to prevent vertical play in the connection, a frame member connected to one of said ball and socket connections and having at its opposite end a bearing coaxial with said ball and socket connections, a crosshead movable in and with respect to said frame, a shaft connecting said crosshead to the other ball and socket connection and slidably mounted in said bearing, and resilient means engaged between said frame and said crosshead for counterbalancing the weight of said piping.

9. A support device for piping systems which comprises a ball and socket secured to a fixed member against vertical movement with respect thereto, a second ball and socket connection secured to the piping below said first-named connection, each of said ball and socket connections being adapted for universal angular and rotary movements by movement of the ball in the socket but said balls each being substantially fitted in its socket whereby to prevent vertical play in the connection, a cylinder connected to one of said ball and socket connections, a piston in said cylinder, a shaft extending through one end of the cylinder connecting said piston to the other ball and socket joint, and a spring within said cylinder engaged between said piston and an end of said cylinder for supporting the weight of the piping.

10. A support device for piping systems which comprises a pair of universal joints each capable of universal angular and rotary movement between their members, and each having its members substantially fitted so that they are substantially incapable of relative axial movements, one of said universal joints being connected to a fixed structure and the other to the piping to be supported therefrom, and a resiliently extensible and retractible member connected between said universal joints.

11. A support device for piping systems which comprises a pair of universal joints each capable of universal angular and rotary movements between their members, and each having its members substantially fitted so that they are substantially incapable of relative axial movements, one of said universal joints being connected to a fixed structure and the other to the piping to be supported therefrom, and a resiliently extensible and retractible dashpot member connected between said universal joints.

JOSEPH KAYE WOOD.

REFERENCES CITED

The following references are of record in the file of this patent:

UNITED STATES PATENTS

| Number | Name | Date |
| --- | --- | --- |
| 1,049,085 | Healy et al. | Dec. 31, 1912 |
| 1,382,783 | Howard | June 28, 1921 |
| 1,460,697 | Bendlin | July 3, 1923 |
| 2,083,277 | Scott | June 8, 1937 |
| 2,170,296 | Frank et al. | Aug. 22, 1931 |
| 2,305,048 | Wert | Dec. 15, 1942 |